(12) United States Patent
Tagawa

(10) Patent No.: US 7,595,576 B2
(45) Date of Patent: Sep. 29, 2009

(54) BRUSH-LESS TYPE ROTATION DETECTOR SHIELDING STRUCTURE

(75) Inventor: Hiroshi Tagawa, Hachinohe (JP)

(73) Assignee: Tamagawa Seiki Co., Ltd., Nagano (JP)

( * ) Notice: Subject to any disclaimer, the term of this patent is extended or adjusted under 35 U.S.C. 154(b) by 86 days.

(21) Appl. No.: 10/574,020

(22) PCT Filed: Sep. 16, 2004

(86) PCT No.: PCT/JP2004/013556

§ 371 (c)(1),
(2), (4) Date: Dec. 18, 2006

(87) PCT Pub. No.: WO2005/029685

PCT Pub. Date: Mar. 31, 2005

(65) Prior Publication Data

US 2007/0216242 A1 Sep. 20, 2007

(30) Foreign Application Priority Data

Sep. 24, 2003 (JP) .............................. 2003-331084

(51) Int. Cl.
*H02K 24/00* (2006.01)
*G01D 5/245* (2006.01)

(52) U.S. Cl. .................. 310/161; 336/115; 310/160; 310/171

(58) Field of Classification Search .................. 310/161; 336/115
See application file for complete search history.

(56) References Cited

U.S. PATENT DOCUMENTS 5,347,256 A * 9/1994 Yumiki et al. ............. 336/84 C
5,394,760 A * 3/1995 Persson et al. ........... 73/862.331
5,705,872 A * 1/1998 Loge ........................... 310/161
6,118,201 A * 9/2000 Dulin et al. ................. 310/161
6,512,437 B2 * 1/2003 Jin et al. ...................... 336/178
6,952,152 B2 * 10/2005 Miya et al. .................. 336/115
2004/0046627 A1* 3/2004 Tezuka et al. ................ 336/115

FOREIGN PATENT DOCUMENTS

| JP | U62-161573 | 10/1987 |
|----|----|----|
| JP | 63-089043 | 4/1988 |
| JP | A2001-141516 | 5/2001 |
| JP | 2001-272204 | 10/2001 |

OTHER PUBLICATIONS

International Search Report dated Nov. 9, 2004 corresponding to International Application No. PCT/JP2004/013556.

* cited by examiner

*Primary Examiner*—Burton Mullins
(74) *Attorney, Agent, or Firm*—Fay Sharpe LLP

(57) ABSTRACT

It is possible to provide a brush-less type rotation detector shielding structure capable of reducing the interference of magnetic flux leaking from a rotation transformer to a stator iron core and rotor iron core and suppressing lowering of the angle detection accuracy. As shown in FIG. 1, the shielding structure is used for a brush-less type rotation detector including: a rotation transformer having a rotor transformer (3) and stator transformer (4); a signal modulation section having a stator iron core (2) and a rotor iron core (1); and a case (5) for containing them. The shielding structure has a main configuration having a stator magnetic shielding section (44) capable of magnetically shielding between the stator iron core (2) constituting the signal modulation section and the stator transformer (4).

10 Claims, 5 Drawing Sheets

PRIOR ART

US 7,595,576 B2

BRUSH-LESS TYPE ROTATION DETECTOR SHIELDING STRUCTURE

TECHNICAL FIELD

The present invention relates to a shielding structure for a brushless type rotation detector for detecting a rotation angle of a rotary machine, and more particularly, to a shielding structure for a brushless type rotation detector capable of reducing interference of magnetic flux leaking from a rotation transformer with a stator iron core or a rotor iron core, and restraining a reduction in angle detection accuracy.

BACKGROUND ART

Brushless type rotation detectors such as brushless resolvers or brushless synchros transmit signals using a rotation transformer constituted by a stator transformer and a rotor transformer instead of a brush.

FIG. 5 is a half section showing a structure for a brushless resolver as an example of a conventional brushless type rotation detector. In the figure, the conventional brushless resolver includes a signal modulation section (constituted by 51 and 52, or the like described later) for modulating an output voltage induced by an excitation voltage according to a rotation angle to be detected, and a case 55 that houses the signal modulation section, and the signal modulation section includes a rotor iron core 51, a stator iron core 52, a rotor transformer 53, and a stator transformer 54, around each of which a coil is wound. Conventional resolvers including such a structure are disclosed in FIG. 2 of the invention of "a resolver" disclosed in Japanese Patent Laid-Open No. 11-322662 (the entire document and FIG. 2), and many other patent documents.

DISCLOSURE OF THE INVENTION

A general conventional brushless type rotation detector is reliable. However, a rotation transformer used has a gap, which causes leakage of magnetic flux, and the magnetic flux interferes with a stator iron core or a rotor iron core to reduce angle detection accuracy of the rotation detector.

An object of the present invention is to provide a shielding structure for a brushless type rotation detector capable of solving the problem of the above described conventional technique, reducing interference of magnetic flux leaking from a rotation transformer with a stator iron core or a rotor iron core, and restraining a reduction in angle detection accuracy.

The inventor of the application has studied the above described problem, and found that the problem can be solved by providing a magnetic shielding plate between a rotation transformer and a stator iron core, leading to the present invention. Specifically, the invention claimed or at least disclosed in the application as means for solving the problem is as described below.

(1) A shielding structure for a brushless type rotation detector including: a signal modulation section for modulating an output voltage induced by an excitation voltage according to a rotation angle to be detected; and a case that houses the signal modulation section, characterized in that the shielding structure includes a stator magnetic shielding section that can provide a magnetic shield between a stator iron core and a stator transformer that constitute the signal modulation section.

(2) The shielding structure for a brushless type rotation detector characterized in that the shielding structure is a ring-shaped structure including the stator magnetic shielding section and a securing section for mounting the structure to an inner surface of the case, the securing section is formed into a flange shape and has an insertion hole section into which a lead from the stator iron core is inserted, and the stator magnetic shielding section has the same radial width as the stator transformer and the stator iron core and is formed without a hole section.

(3) The shielding structure for a brushless type rotation detector characterized in that the shielding structure is a ring-shaped structure including the stator magnetic shielding section integrally formed with the case, and the stator magnetic shielding section has the same radial width as the stator transformer and the stator iron core and is formed without a hole section.

(4) The shielding structure for a brushless type rotation detector characterized in that the stator magnetic shielding section has a radial width capable of also providing a shield between the rotor transformer and the rotor iron core.

(6) The shielding structure for a brushless type rotation detector characterized in that the shielding structure is a ring-shaped structure including the rotor magnetic shielding section and a securing section for mounting the structure to a surface of the rotor, the securing section is formed into a flange shape, and the rotor magnetic shielding section has the same radial width as the rotor transformer and the rotor iron core.

(7) The shielding structure for a brushless type rotation detector characterized in that the shielding structure is a ring-shaped structure including the rotor magnetic shielding section integrally formed with the rotor, and the rotor magnetic shielding section has the same radial width as the rotor transformer and the rotor iron core.

(8) The shielding structure for a brushless type rotation detector characterized in that the rotor magnetic shielding section has a radial width capable of also providing a shield between the stator transformer and the stator iron core.

(10) The shielding structure for a brushless type rotation detector that can be used in a one phase excitation/two phase output brushless resolver, a two phase excitation/one phase output brushless resolver, or a two phase excitation/two phase output brushless resolver.

Specifically, according to the present invention, a magnetic shielding plate is provided between the rotation transformer and the stator iron core to reduce interference of magnetic flux leaking from the rotation transformer with the stator iron core or the rotor iron core, and restrain a reduction in angle detection accuracy of the brushless type rotation detector.

The shielding structure for a brushless type rotation detector according to the present invention is configured as described above. This reduces interference of magnetic flux leaking from the rotation transformer with the stator iron core or the rotor iron core, and restrains a reduction in angle detection accuracy.

DESCRIPTION OF SYMBOLS

1 . . . rotor iron core, 2 . . . stator iron core, 3 . . . rotor transformer, 4 . . . stator transformer, 5 . . . case, 6 . . . input/output signal wire, 8 . . . axis, 18 . . . rotor 44, 44a, 44b . . . stator magnetic shielding section, 34, 34a, 34b . . . rotor magnetic shielding section, 30, 40 . . . securing section, 48 . . . insertion hole section, 51 . . . rotor iron core, 52 . . . stator iron core, 53 . . . rotor transformer, 54 . . . stator transformer, 55 . . . case, 56 . . . input/output signal wire, 58 . . . axis

BEST MODE FOR CARRYING OUT THE INVENTION

Now, the present invention will be described in detail with reference to the drawings.

Figure 1:
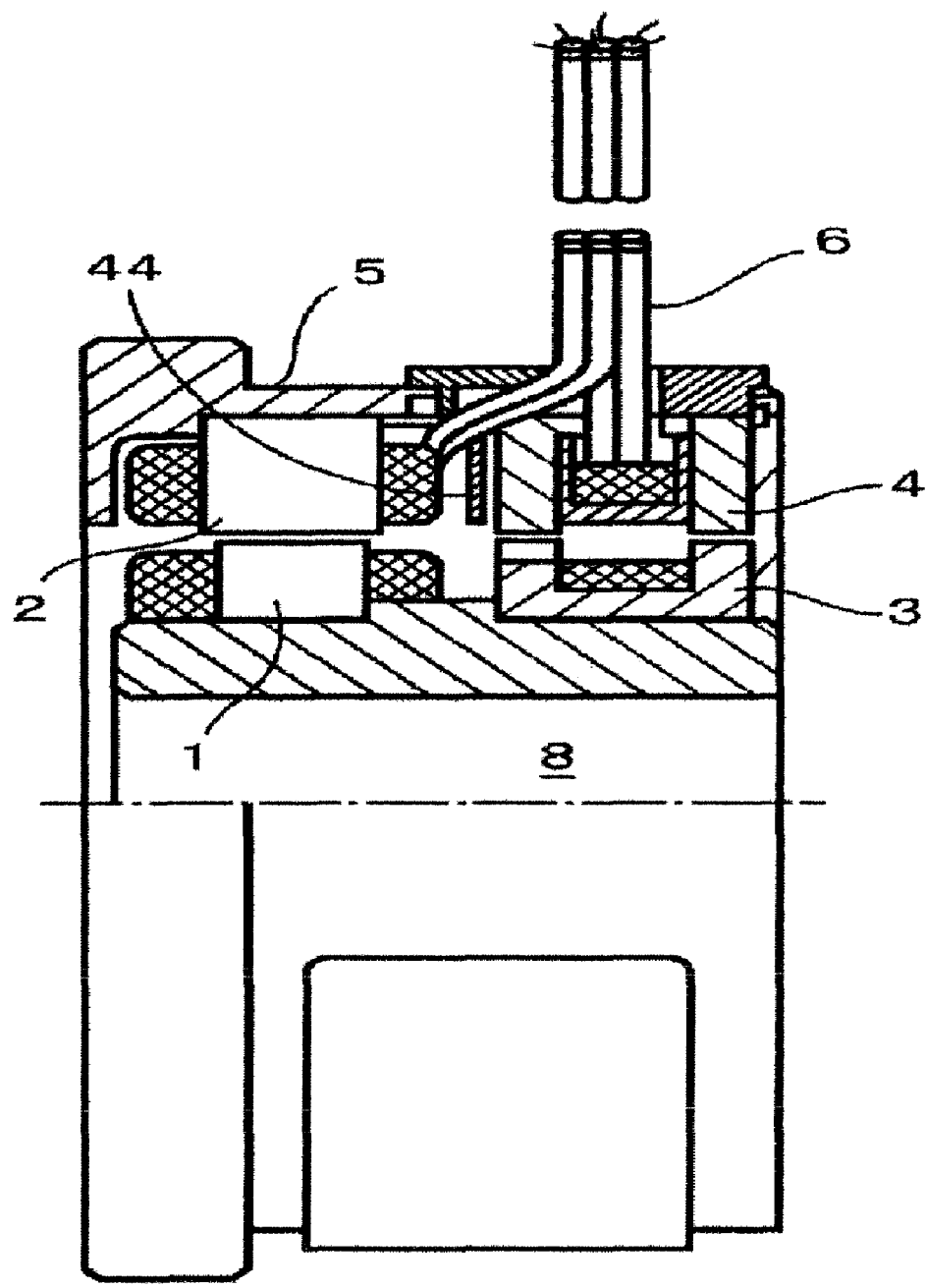
FIG. 1 is a half section showing an example of a shielding structure for a brushless type rotation detector according to the present invention.

FIG. 1 is a half section showing a configuration of a shielding structure for a brushless type rotation detector according to the present invention taking a brushless resolver as an example. In the figure, the shielding structure is a shielding structure for a brushless type rotation detector including a signal modulation section including a rotation transformer constituted by a rotor transformer 3 and a stator transformer 4, a stator iron core 2, and a rotor iron core 1, for modulating an output voltage induced by an excitation voltage according to a rotation angle to be detected, and a case 5 that houses the signal modulation section, wherein the shielding structure includes a stator magnetic shielding section 44 that provides a magnetic shield between the stator iron core 2 and the stator transformer 4 that constitute the signal modulation section.

In the figure, with such a configuration of the shielding structure, magnetic flux leaking from the stator transformer 4 toward the stator iron core 2 is shielded by the stator magnetic shielding section 44, thereby reducing interference of the magnetic flux leaking from the stator transformer 4 with the stator iron core 2, and restraining a reduction in angle detection accuracy. A magnetic shielding effect is prominently produced mainly in the stator iron core 2, but the magnetic shielding effect also covers the rotor iron core 1.

Figure 2:
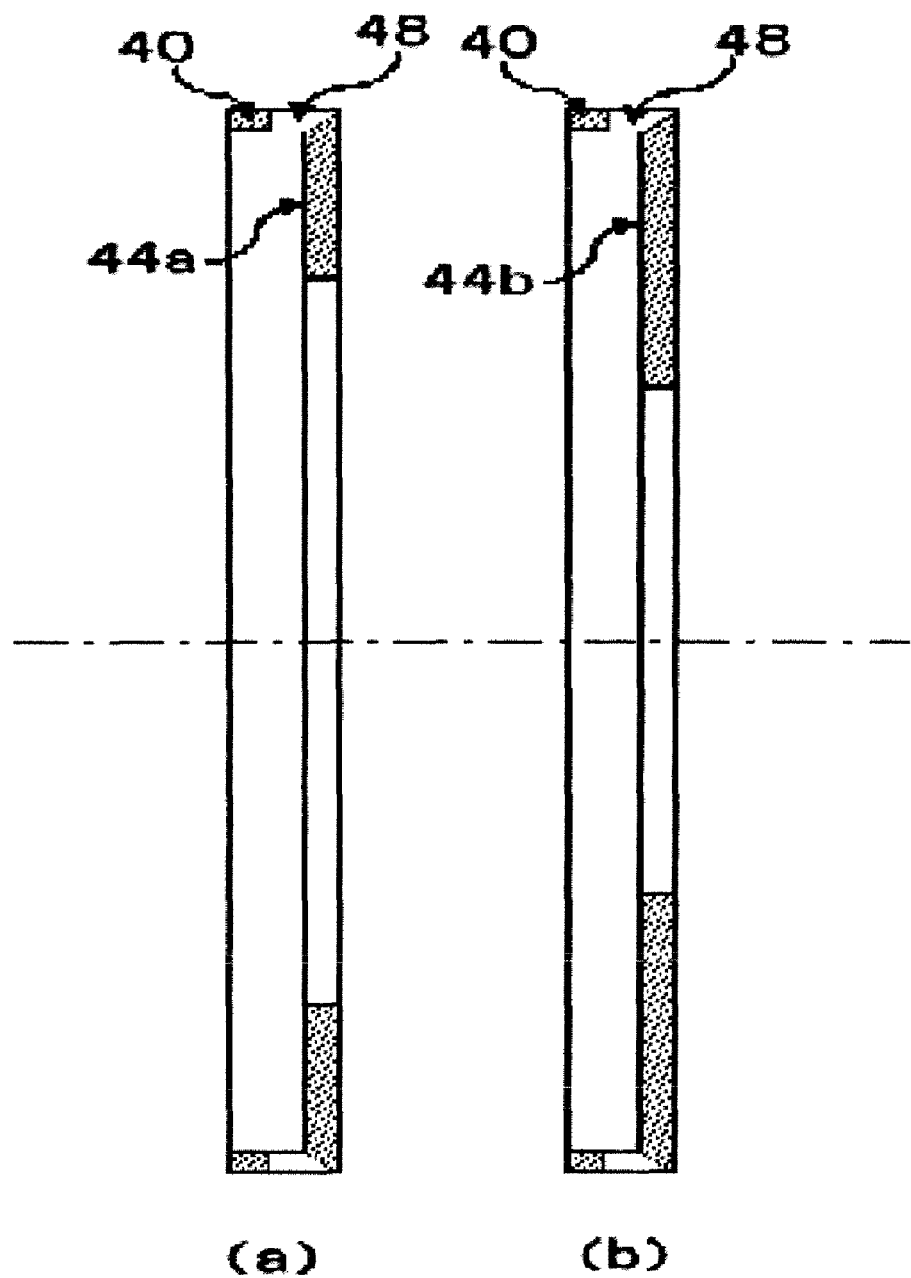
FIG. 2 is a section showing essential portions of the shielding structure in FIG. 1.

FIG. 2 is a section showing the example of the shielding structure according to the present invention. In FIG. 2(a), the shielding structure is a ring-shaped structure including a stator magnetic shielding section 44a and a securing section 40 for mounting the structure to an inner surface of the case (5) in addition to the configuration described with reference to FIG. 1, the securing section 40 is formed into a flange shape and has an insertion hole section 48 into which a lead from the stator iron core (2) is inserted, and the stator magnetic shielding section 44a has the same radial width as the stator transformer (4) and the stator iron core (2) and is formed without a hole section.

In the figure, with such a configuration of the shielding structure, the shielding structure may be mounted to the inside of the case of the brushless type rotation detector such as the brushless resolver by the securing section 40, thereby producing the above described magnetic shielding effect with the stator magnetic shielding section 44a. Also, the lead from the stator iron core is passed through the insertion hole section 48 provided in the securing section 40. Thus, there is no need for providing a hole section in the stator magnetic shielding section 44a, and the entire stator magnetic shielding section is formed to have a uniform shielding effect, thereby preventing a reduction in magnetic shielding effect.

Irrespective of the configuration shown in FIG. 2(a), the shielding structure may have a ring-shaped structure with the stator magnetic shielding section integrally formed with the case. In this case, like FIG. 2(a), the stator magnetic shielding section may have the same radial width as the stator transformer and the stator iron core and be formed without a hole section. With such a configuration, the shielding structure according to the present invention may be obtained in an integral manner with the case in a case manufacturing process, which eliminates the need for a later mounting process as compared with the case where the shielding structure is manufactured as a separate component.

FIG. 2(b) is a section showing a shielding structure according to the present invention having a ring-shaped structure taking an example different from the example in FIG. 2(a). In the figure, the shielding structure is characterized in that a stator magnetic shielding section 44b has a radial width capable of also providing a shield between the rotor transformer and the rotor iron core. With such a configuration, the magnetic flux leaking from the stator transformer 4 toward the stator iron core 2 as described with reference to FIG. 1 is shielded by the stator magnetic shielding section 44b in this figure, thereby reducing interference of the magnetic flux leaking from the stator transformer 4 with the stator iron core 2, and restraining a reduction in angle detection accuracy. Further, the magnetic flux leaking from the rotor transformer 3 toward the rotor iron core 1 in FIG. 1 is also shielded by the stator magnetic shielding section 44b in this figure, thereby reducing interference of the magnetic flux leaking from the rotor transformer 3 with the rotor iron core 2, and restraining a reduction in angle detection accuracy. This provides a more effective shield of the magnetic flux leaking from the rotation transformer to increase a reduction restraining effect of the angle detection accuracy. Such a configuration may be similarly used in the shielding structure integrally formed with the case besides the shielding structure as a separate component as shown in FIG. 2(b).

Figure 3:
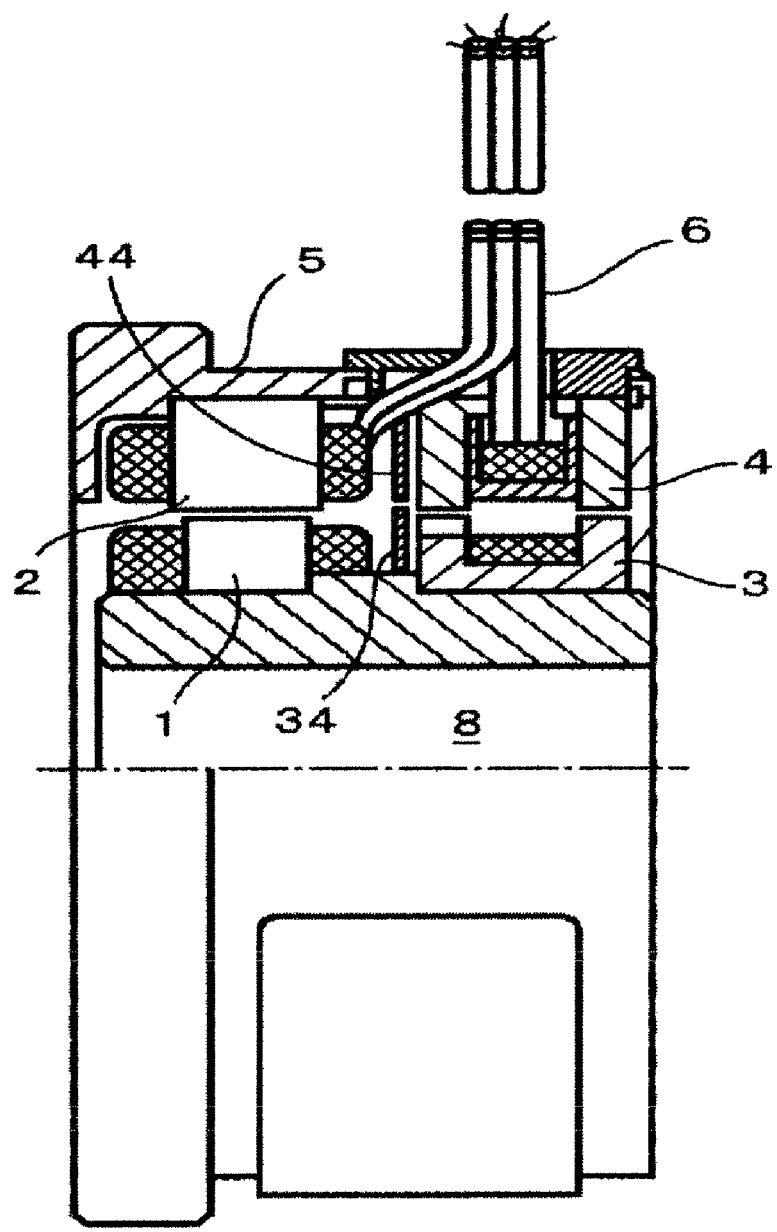
FIG. 3 is a half section showing another example of a shielding structure for a brushless type rotation detector according to the present invention.

FIG. 3 is a half section showing another configuration of a shielding structure for a brushless type rotation detector according to the present invention taking a brushless resolver as an example. In the figure, the shielding structure is a shielding structure for a brushless type rotation detector including a signal modulation section (including 3, 4, 2, and 1) for modulating an output voltage induced by an excitation voltage according to a rotation angle to be detected, and a case 5 that houses the signal modulation section, wherein the shielding structure includes a rotor magnetic shielding section 34 that provides a magnetic shield between a rotor iron core 1 and a rotor transformer 3 that constitute the signal modulation section.

In the figure, with such a configuration of the shielding structure, magnetic flux leaking from the rotor transformer 3 toward the rotor iron core 1 is shielded by the rotor magnetic shielding section 44, thereby reducing interference of the magnetic flux leaking from the rotor transformer 3 with the rotor iron core 1, and restraining a reduction in angle detection accuracy. A magnetic shielding effect is prominently produced mainly in the rotor iron core 1, but the magnetic shielding effect also covers the stator iron core 2.

Figure 4:
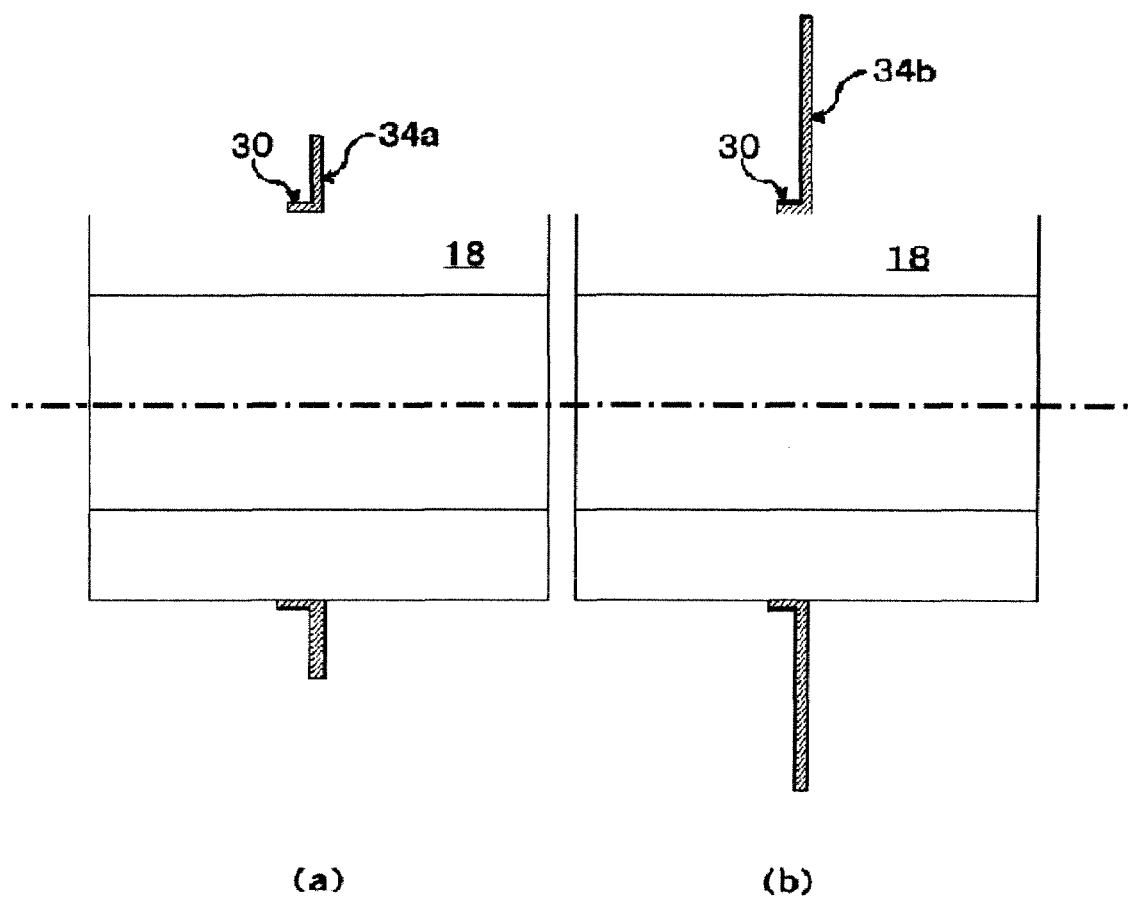
FIG. 4 is a section showing essential portions of the shielding structure in FIG. 3.
Figure 5:
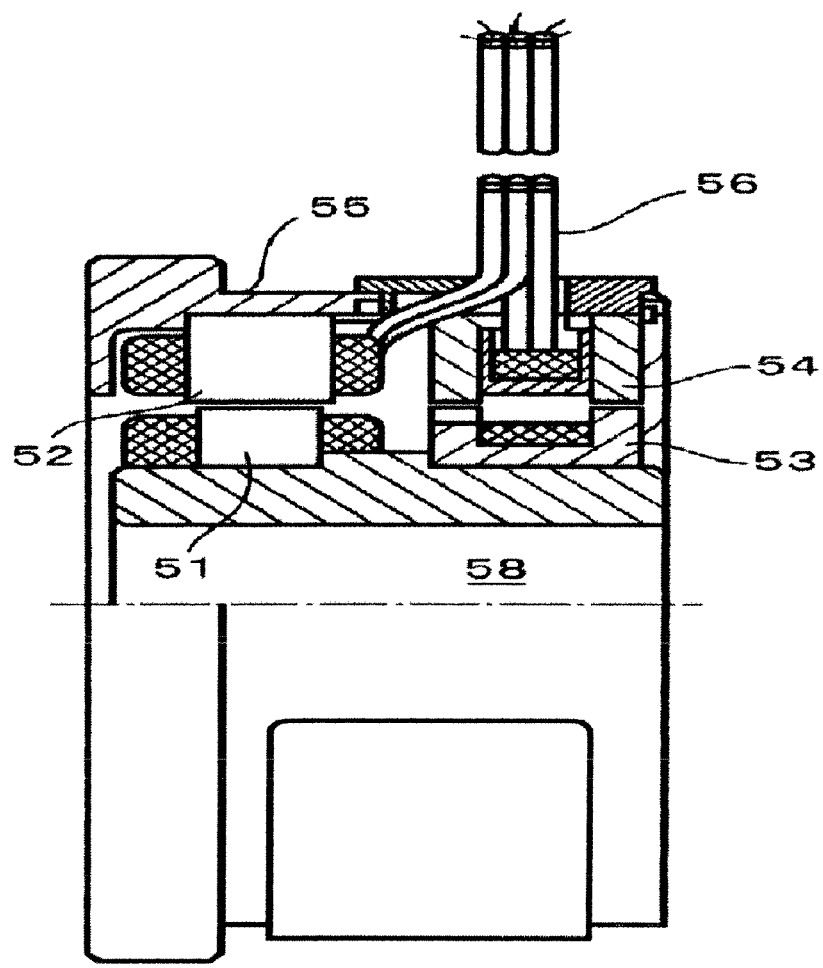
FIG. 5 is a half section showing an example of a conventional brushless type rotation detector.

FIG. 4 is a section showing the example of the shielding structure according to the present invention. In FIG. 4(a), the shielding structure is a ring-shaped structure including a rotor magnetic shielding section 34a, and a securing section 30 for mounting the structure to a surface of a rotor 18 in addition to the configuration described with reference to FIG. 3, the securing section 30 is formed into a flange shape, and the rotor magnetic shielding section 34a has the same radial width as the rotor transformer and the rotor iron core.

In the figure, with such a configuration of the shielding structure, the shielding structure may be mounted to the rotor 18 of the brushless type rotation detector such as the brushless resolver by the securing section 30, thereby producing the above described magnetic shielding effect with the rotor magnetic shielding section 34a.

Irrespective of the configuration shown in FIG. 4(a), the shielding structure may have a ring-shaped structure with the rotor magnetic shielding section integrally formed with the rotor. In this case, like FIG. 4(a), the rotor magnetic shielding section may have the same radial width as the rotor transformer and the rotor iron core. With such a configuration, the shielding structure according to the present invention may be obtained in an integral manner with the rotor in a rotor manufacturing process, which eliminates the need for a later mounting process as compared with the case where the shielding structure is manufactured as a separate component.

FIG. 4(b) is a section showing a shielding structure according to the present invention having a ring-shaped structure taking an example different from the example in FIG. 4(a). In the figure, the shielding structure is characterized in that a rotor magnetic shielding section 34b has a radial width capable of also providing a shield between the stator transformer and the stator iron core. With such a configuration, the magnetic flux leaking from the rotor transformer 3 toward the rotor iron core 1 as described with reference to FIG. 3 is shielded by the rotor magnetic shielding section 34b in this figure, thereby reducing interference of the magnetic flux leaking from the rotor transformer 3 with the rotor iron core 2, and restraining a reduction in angle detection accuracy. Further, the magnetic flux leaking from the stator transformer 4 toward the stator iron core 2 in FIG. 3 is also shielded by the rotor magnetic shielding section 34b in this figure, thereby reducing interference of the magnetic flux leaking from the stator transformer 4 with the stator iron core 1, and restraining a reduction in angle detection accuracy. This provides a more effective shield of the magnetic flux leaking from the rotation transformer to increase a reduction restraining effect of the angle detection accuracy. Such a configuration may be similarly used in the shielding structure integrally formed with the rotor besides the shielding structure as a separate component as shown in FIG. 4(b).

As shown in FIG. 3, the shielding structure for a brushless type rotation detector according to the present invention may include both a stator section shielding structure 44 having the stator magnetic shielding section that can provide the magnetic shield between the stator iron core 2 and the stator transformer 4 that constitute the signal modulation section, and a rotor section shielding structure 34 having the rotor magnetic shielding section that can provide the magnetic shield between the rotor iron core 1 and the rotor transformer 3 that constitute the signal modulation section. With such a configuration, the magnetic flux leaking from the rotation transformer is effectively shielded both on the rotor side and the stator side, thereby producing a higher reduction restraining effect of the angle detection accuracy.

The shielding structure for a brushless type rotation detector according to the present invention described above may be used in a one phase excitation/two phase output brushless resolver, a two phase excitation/one phase output brushless resolver, or a two phase excitation/two phase output brushless resolver. The present invention includes various configurations for producing the magnetic shielding effect, and an appropriate configuration of the shielding structure may be selected therefrom according to individual specifications, use, or cost efficiency including detection accuracy required by the rotation detector to which the shielding structure is applied.

INDUSTRIAL APPLICABILITY

The shielding structure for a brushless type rotation detector according to the present invention is configured as described above, thereby reducing interference of the magnetic flux leaking from the rotation transformer with the stator iron core or the rotor iron core, and restraining a reduction in angle detection accuracy. The shielding structure may be easily used for a brushless type rotation detector such as a brushless resolver or a brushless synchro, and is an industrially applicable invention.

The invention claimed is:

1. A shielding structure for a brushless type rotation detector comprising,
   a signal modulation section for modulating an output voltage induced by an excitation voltage according to a rotation angle to be detected; and
   a case that houses the signal modulation section,
   characterized in that said shielding structure includes a rotor magnetic shielding section that can provide a magnetic shield between a rotor iron core and a rotor transformer that constitute said signal modulation section,
   characterized in that said shielding structure is a ring-shaped structure including said rotor magnetic shielding section and a securing section for mounting the structure to a surface of said rotor, said securing section is formed into a flange shape, and said rotor magnetic shielding section has the same radial width as said rotor transformer and the rotor iron core.

2. The shielding structure for a brushless type rotation detector according to claim 1, characterized in that said rotor magnetic shielding section has a radial width capable of also providing a shield between said stator transformer and the stator iron core.

3. The shielding structure for a brushless type rotation detector according to claim 2 that can be used in a one phase excitation/two phase output brushless resolver, a two phase excitation/one phase output brushless resolver, or a two phase excitation/two phase output brushless resolver.

4. The shielding structure for a brushless type rotation detector according to claim 1, that can be used in a one phase excitation/two phase output brushless resolver, a two phase excitation/one phase output brushless resolver, or a two phase excitation/two phase output brushless resolver.

5. The shielding structure for a brushless type rotation detector according to claim 1, characterized in that said shielding structure includes a stator section shielding structure having a stator iron core and a stator transformer that constitute said signal modulation section.

6. The shielding structure for a brushless type rotation detector according to claim 5 that can be used in a one phase excitation/two phase output brushless resolver, a two phase excitation/one phase output brushless resolver, or a two phase excitation/two phase output brushless resolver.

7. A shielding structure for a brushless type rotation detector comprising:
   a signal modulation section for modulating an output voltage induced by an excitation voltage according to a rotation angle to be detected; and
   a case that houses the signal modulation section,
   characterized in that said shielding structure includes a stator section shielding structure having a stator magnetic shielding section that can provide a magnetic shield between a stator iron core and a stator transformer that constitute said signal modulation section, and a rotor section shielding structure having a rotor magnetic shielding section that can provide a magnetic shield between a rotor iron core and a rotor transformer that constitute said signal modulation section characterized in that said shielding structure is a ring-shaped structure including said rotor magnetic shielding section and a securing section for mounting the structure to a surface of said rotor, said securing section is formed into a flange shape, and said rotor magnetic shielding section has the same radial width as said rotor transformer and the rotor iron core.

8. The shielding structure for a brushless type rotation detector according to claim 7 that can be used in a one phase excitation/two phase output brushless resolver, a two phase excitation/one phase output brushless resolver, or a two phase excitation/two phase output brushless resolver.

9. A shielding structure for a brushless type rotation detector comprising:

a signal modulation section for modulation an output voltage induced by an excitation voltage according to a rotation angle to be detected; and a case that houses the signal modulation section, characterized in that said shielding structure includes a rotor magnetic shielding section that can provide a magnetic shield between a rotor iron core and a rotor transformer that constitute said modulation section, characterized in that said shielding structure is a ring-shaped structure including said rotor magnetic shielding section integrally formed with said rotor, and said rotor magnetic shielding section has the same radial width as said rotor transformer and the rotor iron core, characterized in that said rotor magnetic shielding section has a radial width capable of also providing a shield between said stator transformer and the stator iron core.

10. The shielding structure for a brushless type rotation detector according to claim 9 that can be used in a one phase excitation/two phase output brushless resolver, a two phase excitation/one phase output brushless resolver, or a two phase excitation/two phase output brushless resolver.

* * * * *